(12) United States Patent
Bruch

(10) Patent No.: US 11,353,430 B2
(45) Date of Patent: Jun. 7, 2022

(54) PHASED ARRAY PROBE AND METHOD FOR TESTING A SPOT-WELD

(71) Applicant: Baker Hughes Oilfield Operations LLC, Houston, TX (US)

(72) Inventor: Tobias Bruch, Cologne (DE)

(73) Assignee: Baker Hughes Oilfield Operations LLC, Houston, TX (US)

(*) Notice: Subject to any disclaimer, the term of this patent is extended or adjusted under 35 U.S.C. 154(b) by 362 days.

(21) Appl. No.: 15/916,510

(22) Filed: Mar. 9, 2018

(65) Prior Publication Data

US 2018/0259489 A1 Sep. 13, 2018

Related U.S. Application Data

(60) Provisional application No. 62/470,598, filed on Mar. 13, 2017.

(51) Int. Cl.
*G01N 29/06* (2006.01)
*G01N 29/26* (2006.01)
*G01N 29/24* (2006.01)

(52) U.S. Cl.
CPC ......... *G01N 29/0645* (2013.01); *G01N 29/24* (2013.01); *G01N 29/262* (2013.01); *G01N 2291/2672* (2013.01)

(58) Field of Classification Search
CPC .......................... G01N 29/0645; G01N 29/24
See application file for complete search history.

(56) References Cited

U.S. PATENT DOCUMENTS

| 4,821,575 | A |   | 4/1989 | Fujikake et al. |
| 5,119,678 | A | * | 6/1992 | Bashyam ............... G01B 17/02 73/602 |
| 6,072,144 | A | * | 6/2000 | Perryman ............ G01N 29/069 219/109 |

(Continued)

FOREIGN PATENT DOCUMENTS

| EP | 1391875 A1 * | 2/2004 | ......... G01S 15/8963 |
| EP | 1873519 A2 * | 1/2008 | ........... G01N 29/223 |

(Continued)

OTHER PUBLICATIONS

International Search Report and Written Opinion issued in connection with corresponding PCT Application No. PCT/US2018/022192 dated Jun. 28, 2018.

*Primary Examiner* — Matthew G Marini
(74) *Attorney, Agent, or Firm* — Mintz Levin Cohn Ferris Glovsky and Popeo, PC; Lisa Adams

(57) ABSTRACT

A phased array probe system and method for testing a spot-weld on a structure. The phased array probe includes a plurality of transducers and may include a flexible delay line. The phased array probe is positioned at a first position on the structure relative to the spot-weld. First ultrasonic signals are generated to and received from the spot-weld using at least one first transducer of the phased array probe. The first received ultrasonic signals are processed to determine a second optimized position on the structure relative to the spot-weld. Second ultrasonic signals are generated at the second optimized position to and received from the spot-weld using second transducers of the phased array probe. The second received ultrasonic signals are processed to determine a feature dimension of the spot-weld.

16 Claims, 13 Drawing Sheets

(56) References Cited

U.S. PATENT DOCUMENTS

| | | | | |
|---|---|---|---|---|
| 7,757,557 | B2* | 7/2010 | Thomas | G01N 29/449 |
| | | | | 73/602 |
| 9,188,567 | B2* | 11/2015 | MacLauchlan | G01N 29/265 |
| 2006/0283250 | A1 | 12/2006 | Fair et al. | |
| 2012/0243771 | A1* | 9/2012 | Matsumoto | G01N 29/069 |
| | | | | 382/141 |
| 2015/0253288 | A1* | 9/2015 | Spencer | G01N 29/24 |
| | | | | 73/602 |
| 2016/0169840 | A1 | 6/2016 | Todorov et al. | |

FOREIGN PATENT DOCUMENTS

| | | |
|---|---|---|
| JP | 2008203082 A | 9/2008 |
| JP | 2011117877 A | 6/2011 |
| KR | 20-0477791 Y1 | 7/2015 |

\* cited by examiner

PHASED ARRAY PROBE AND METHOD FOR TESTING A SPOT-WELD

CROSS-REFERENCE TO RELATED APPLICATION(S)

This application claims priority to U.S. Provisional Patent Application Ser. No. 62/470,598, filed Mar. 13, 2017, which is hereby incorporated herein by reference in its entirety.

TECHNICAL FIELD

The subject matter disclosed herein relates to the field of non-destructive testing, and more particularly to ultrasonic systems used for non-destructive testing of spot-welds.

BACKGROUND

Sheet metal joining processes are widely used in many industries including the automotive industry. Among these processes, resistance spot welding is a very common procedure used to join metal sheets, and laser spot or seam welding has also gained acceptance. The quality control of such joining processes has been recognized as a critical issue to manufactures. Currently, spot-welds are inspected either by conventional single element probes or matrix phased-array systems. These ultrasonic inspection systems attempt to detect spot weld flaws like stick-welds, burned spot-welds, bad-though welding and loose spot-welds, as well as try to assess, directly or indirectly, that the spot weld nugget diameter has a minimal required diameter. For instance, in spot welding, welding overlapped pieces of metal by application of laser or current leads to molten metal that quickly cools and solidifies into a joint known as a nugget.

One type of ultrasonic transducer—a phased array transducer—comprises a plurality of electrically and acoustically independent transducer elements that incorporate piezoelectric ceramics. During operation, electrical waveform pulses are applied to the electrodes of the phased array transducer elements of the probe causing a mechanical change in the condition of the piezoelectric ceramics and generating ultrasonic signals (e.g. ultrasonic beams) that can be transmitted through the material to which the probe is coupled. By varying the timing of the electrical waveform pulses applied to the phased array transducer elements, the phased array transducer can generate ultrasonic beams at different angles, allowing the phased array transducer to steer the ultrasonic beam at different angles through the test object to try to detect anomalies. When an ultrasonic beam reflected from the material under inspection contacts the surface of the piezoelectric ceramic of a phased array transducer element, it generates a voltage difference across the electrodes that is detected as a receive signal by signal processing electronics. As the ultrasonic beams pass through the object, various pulse reflections called echoes occur as the ultrasonic beams interact with internal structures (e.g., anomalies) within the test object. By tracking the time difference between the transmission of the electrical pulse and the receipt of the electrical signal, and measuring the amplitude of the received ultrasonic signal, various characteristics of the material can be determined. These echoes allow the depth and size of anomalies within a given test object to be determined.

While conventional single element probes can reliably detect flaws like stick-welds, burned spot-welds, bad-though welding and loose spot-welds a direct measurement of the minimal nugget diameter cannot be achieved by conventional single element probes. Currently available conventional matrix phased array systems employ phased array probes with either 64 or 121 elements and a hard rexolite delay line. The hard rexolite delay line limits the coupling to the area of interest, since these can have an indent and non-flat coupling surface, due to the welding process. Although such systems can image the spot weld diameter, the limited reproducible coupling leads to non-reproducible inspection results. In addition, it is questionable how these systems can reliably identify stick welds, which are usually identified by the remaining wall thickness of the plates. This is because such measurements can be compromised if the probe cannot be coupled directly and perpendicularly to the spot-weld, as it may be the case with hard delay lines. Currently available systems may employ an amplitude C-scan of the spot-weld and interpolation algorithms to determine the minimal valid nugget diameter. These interpolation algorithms lack the required reconstruction resolution (typically 0.2 mm) for reliably determining the minimal spot weld diameter or the 2-dimensional area of fusion. One available system employs Synthetic Aperture Focusing Technique (SAFT) algorithm to determine the nugget diameter. For laser spot or seam welding it can be crucial to reconstruct the 2-dimensional area of fusion with high resolution since these joints may in principle take arbitrary shapes.

SUMMARY

Disclosed herein, in one aspect, is a method for testing a spot-weld on a structure using a phased array probe. For instance, the phased array probe is positioned on the structure relative to the spot-weld. First generated ultrasonic signals are generated to and first received ultrasonic signals are received from the spot-weld using at least one first transducer of the phased array probe. The first received ultrasonic signals from the at least one first transducer of the phased array probe are processed to determine a second, optimized position and alignment of the phased-array probe to the spot weld. In addition, but not exclusively these first received ultrasonic signals may be used to detected spot-weld defects such as stick-welds, loose welds, burned welds or bad though welding. After this first generated ultrasonic signals second generated ultrasonic signals are generated to and second received ultrasonic signals are received from the spot-weld using second transducers of the phased array probe at the second optimized position. The second received ultrasonic signals from second transducers of the phased array probe are processed to determine a feature dimension of the spot-weld.

In another aspect, a phased array probe system including a phased array probe and a processor, is disclosed. The phased array probe includes a plurality of transducers and a flexible delay line for coupling the phased array probe to the structure. The plurality of transducers includes at least one first transducer and second transducers. The at least one first transducer generates first generated ultrasonic signals to and receives first received ultrasonic signals from the spot-weld at a first position on the structure relative to the spot-weld. First generated ultrasonic signals are generated to and first received ultrasonic signals are received from the spot-weld using at least one first transducer of the phased array probe. The second transducers generate second generated ultrasonic signals to and receive second received ultrasonic signals from the spot-weld at a second optimized position on the structure relative to the spot-weld. The processor is configured for processing the first and second received ultrasonic signals. The first received ultrasonic signals from the at least one first transducer of the phased array probe are processed to determine the second optimal position and alignment of the phased-array probe to the spot weld. In addition, but not exclusively these first received ultrasonic signals may be used to detected spot-weld defects such as stick-welds, loose welds, burned welds or bad though welding. After this first generated ultrasonic signals second generated ultrasonic signals are generated to and second received ultrasonic signals are received from the spot-weld using second transducers of the phased array probe. The second received ultrasonic signals from second transducers of the phased array probe are processed to determine a feature dimension of the spot-weld.

An advantage that may be realized in the practice of some disclosed embodiments of the method or apparatus is that the minimal spot-weld nugget diameter or 2-dimensional area of fusion may be determined with high resolution at a reduced processing time, allowing for a portable manual or in-line automatized inspection unit.

Additional features and aspects of the present invention will become apparent to those skilled in the art upon reading and understanding the following detailed description of the exemplary embodiments.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

DETAILED DESCRIPTION

Figure 1:
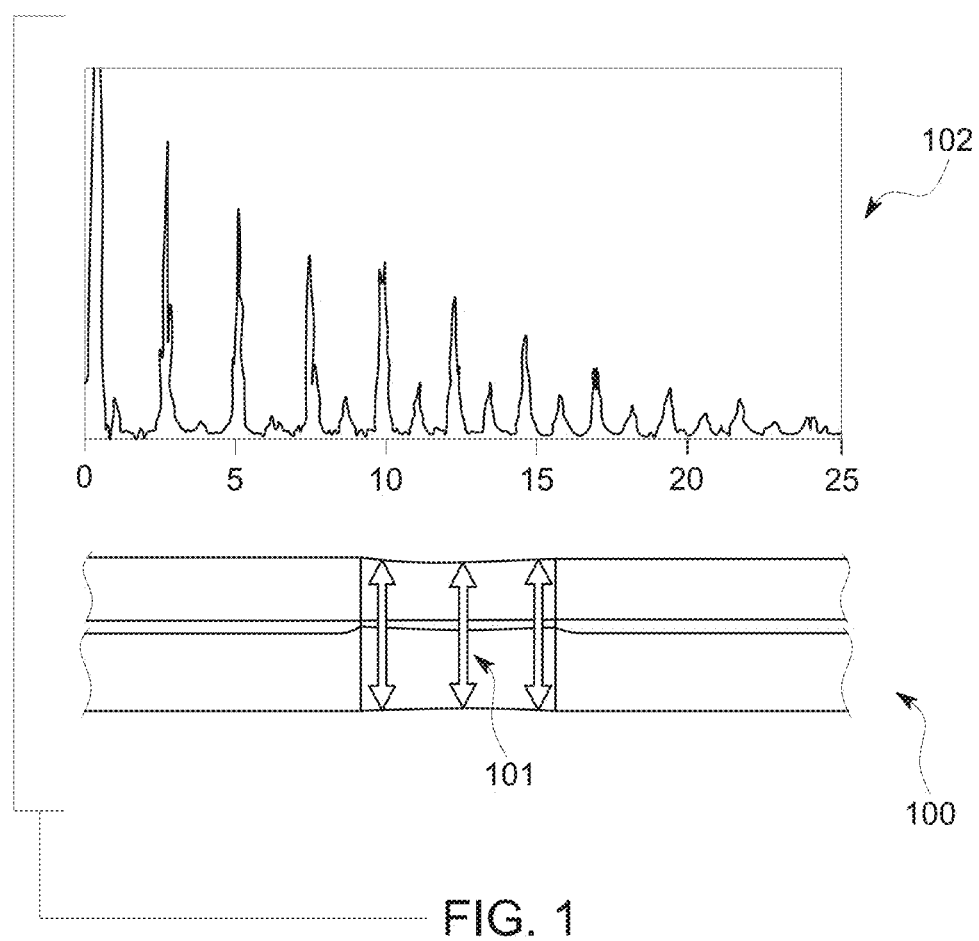
FIGS. 1-4 depict possible features detected by a test system having a single transducer.

Embodiments of the disclosed subject matter provide techniques for non-destructive testing. Other embodiments are within the scope of the disclosed subject matter.

The present disclosure relates to a technique for reliably determining a minimal spot-weld diameter with high resolution and reproducibility of the inspection result. In addition, the technique allows reliably identifying other spot-weld flaws like stick-welds, burned spot-welds, bad-though welding and loose spot-welds like conventional single element probe systems. Further, the technique may can reconstruct the 2-dimensional area of fusion with high resolution and reproducibility.

In one example, a combination of materials allows the probe to conform to the contoured surface of a spot-weld while enabling sound energy to be transferred directly into the spot-weld under test conditions. For instance, the combination of materials includes a flexible membrane mounted on the end of the probe and a fluid filled chamber between the membrane and the array or a flexible rubber delay line mounted directly in front of the array. The probe may be configured to send and receive ultrasonic signals from the phased array probe to examine an inspected object or surface. Only a subset of transducers may be used in emitting and receiving the signals, because of the algorithm employed, and to optimize the amount of time used in processing, as explained in further detail below. The apparatus employs a subset of transducer elements to realize inspection. Other features include displays of a live color-coded ultrasonic C-Scan image of the spot weld under test, or displays of the reconstructed image in a color-coded ultrasonic C-scan images of characterized spot-welds in real time. C-scan images further include minimal diameter of the weld nugget and 2-dimensional area of fusion. The probe may run an identification algorithm to annunciate a pass/fail criteria, e.g., of a spot-weld.

Generally stated, described herein, in one aspect is a method for testing a spot-weld on a structure using a phased array probe. For instance, the phased array probe is positioned at a first position on the structure relative to the spot-weld. First generated ultrasonic signals are generated to and first received ultrasonic signals are received from the spot-weld using at least one first transducer of the phased array probe. The first received ultrasonic signals from the at least one first transducer of the phased array probe are processed to determine the second optimal position and alignment of the phased-array probe to the spot weld. In addition, but not exclusively these first received ultrasonic signals may be used to detected spot-weld defects such as stick-welds, loose welds, burned welds or bad though welding. After this first generated ultrasonic signals second generated ultrasonic signals are generated to and second received ultrasonic signals are received from the spot-weld using all second transducers of the phased array probe. The second received ultrasonic signals from second transducers of the phased array probe are processed to determine a feature dimension of the spot-weld.

In one embodiment, the phased array probe includes a flexible delay line, and positioning and repositioning the phased array probe includes coupling the phased array probe to the structure using the flexible delay line. In another embodiment, processing the second received ultrasonic signals includes using an equation of the form $$A(P) = \left| \sum_{\substack{1 \leq i \leq N \\ 1 \leq j \leq N}} s_{ij}(t_{ij}^P = t_i^P + t_j^P) \right|,$$

where A(P) is the signal amplitude at a point P; $s_{ij}(t)$ is the signal matrix of signals received from transducers, where j (1<j<N) are transmitting and i (1<i<N) are receiving elements; and $t^P_i$ (resp. $t^P_j$) is the time of flight between the receiver i (resp. transmitter j) and point P. In a further embodiment, the time of flight between the transmitter j or receiver i and the point P is determined using an equation of the form $$t_k^P(x, y) = \frac{\sqrt{(x-x_k)^2 + (y-y_k)^2 + s(x, y)^2}}{v_1} + \frac{\sqrt{(x-x_P)^2 + (y-y_P)^2 + (z_P - s(x, y))^2}}{v_2},$$

where: x and y are the coordinates of the surface impact point, while $x_k$ and $y_k$ are the coordinates of the considered elements k where k can be transmitting elements j or receiving elements i, $x_P$, $y_P$ and $z_P$ are the coordinates of the reconstruction point, s(x,y) is the surface profile and $v_1$ and $v_2$ are the sound velocities in the delay (1) and the tested material (2).

In one example, the phased array probe is a rectangular array of the plurality of transducers. In another example, the phased array probe is an annular array of the plurality of transducers. In a further example, the plurality of transducers of the phased array probe includes the at least one first transducer surrounded by the second transducers.

In one configuration, the at least one first transducer is at least one first central transducer and the second transducers are disposed concentrically to the at least one first central transducer. In another configuration, the second transducers are a subset of the plurality of transducers, with the second transducers selected to surround the spot weld. In a further configuration, generating the second generated ultrasonic signals is conducted at both a first probe depth and a second probe depth, and the feature dimension is determined at both the first probe depth and the second probe depth. In yet another configuration, the second transducers comprise a subset of the plurality of transducers, and the ultrasonic sound field second transducers are steered or focused at a certain point to enhance signal quality using single element delay law calculation during transmit and receive of the ultrasonic signals.

In another aspect, a phased array probe system including a phased array probe and a processor, is disclosed. The phased array probe includes a plurality of transducers and a flexible delay line for coupling the phased array probe to the structure. The plurality of transducers includes at least one first transducer and second transducers. The at least one first transducer generates first generated ultrasonic signals to and receives first received ultrasonic signals from the spot-weld at a position on the structure relative to the spot-weld. First generated ultrasonic signals are generated to and first received ultrasonic signals are received from the spot-weld using at least one first transducer of the phased array probe. The second transducers generate second generated ultrasonic signals to and receive second received ultrasonic signals from the spot-weld at a second optimized position on the structure relative to the spot-weld. The processor is configured for processing the first and second received ultrasonic signals. The first received ultrasonic signals from the at least one first transducer of the phased array probe are processed to determine the optimal position and alignment of the phased-array probe to the spot weld. In addition, but not exclusively these first received ultrasonic signals may be used to detected spot-weld defects such as stick-welds, loose welds, burned welds or bad though welding. After this first generated ultrasonic signals second generated ultrasonic signals are generated to and second received ultrasonic signals are received from the spot-weld using all second transducers of the phased array probe. The second received ultrasonic signals from second transducers of the phased array probe are processed to determine a feature dimension of the spot-weld.

By way of overview, FIGS. 1-4 depict possible features that may be present in an object under inspection. Notably, the features depicted in FIGS. 1-4 may be detected using a conventional single transducer test system. In each of the examples of FIG. 1-4, an upper sheet of metal and a lower sheet of metal are to be joined using a spot weld.

FIG. 1 depicts a stick weld 101 detected in a structure or object 100 under inspection and an A-scan 102 displayed on a user interface of a non-destructive test system. The stick weld 101 demonstrates a poor connection of the object 100, as there is little penetration of the weld into the layers of the object 100. Conventional single transducer systems can detect defects such as the stick weld 101. As depicted in the A-scan (102) of FIG. 1, stick welds can be detected by identifying additional echo amplitudes with smaller amplitude in between the echo sequence of the total stack thickness. A more reliable identification of stick welds is achieved by measuring the wall thickness of the total stack from the total stack thickness echo sequence. If the stack thickness is not below a certain threshold value a stick weld is likely possible.

Figure 2:
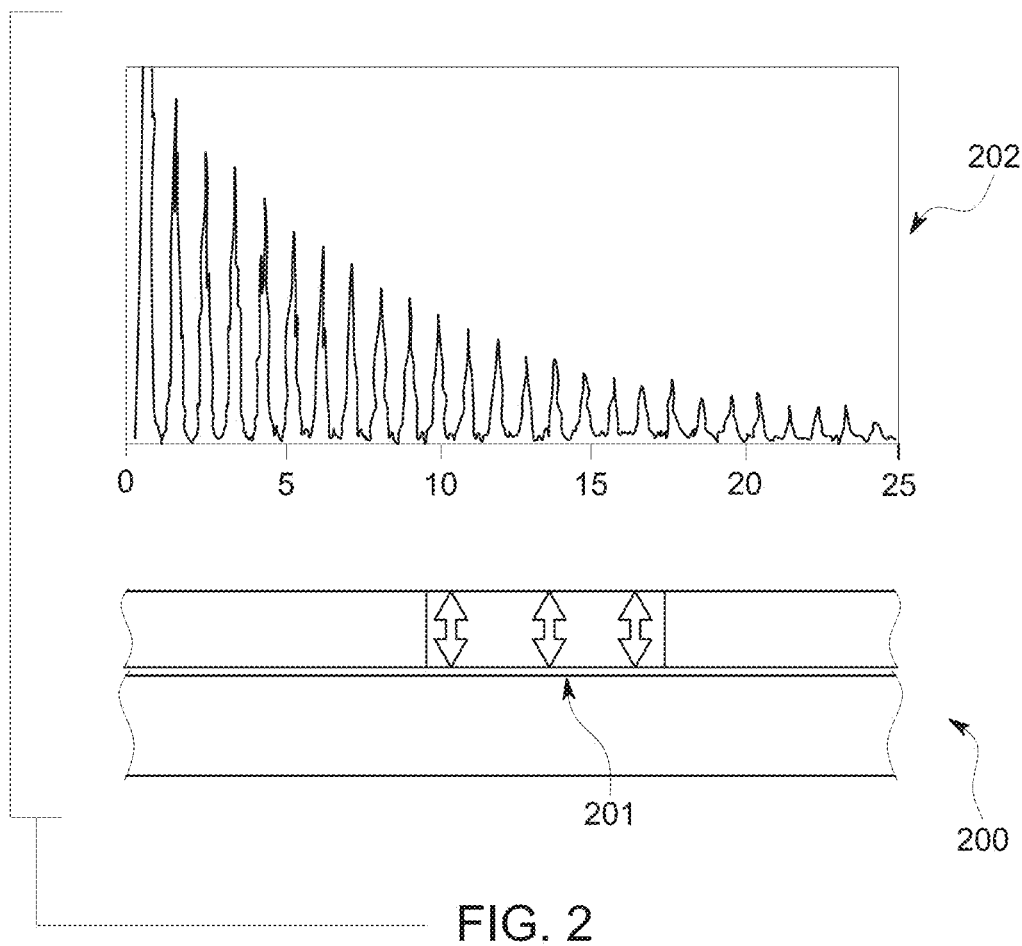

FIG. 2 depicts a loose connection 201 detected in an object 200 under inspection and an A-scan 202 displayed on a user interface of a non-destructive test system. The loose connection 201 defect is also characterized by a no penetration of the weld into the object 200. Conventional single transducer systems can detect defects such as the loose connection 201. As depicted in the A-scan (202) of FIG. 2, loose welds can be detected by identifying an echo sequence of the top sheet thickness only.

Figure 3:
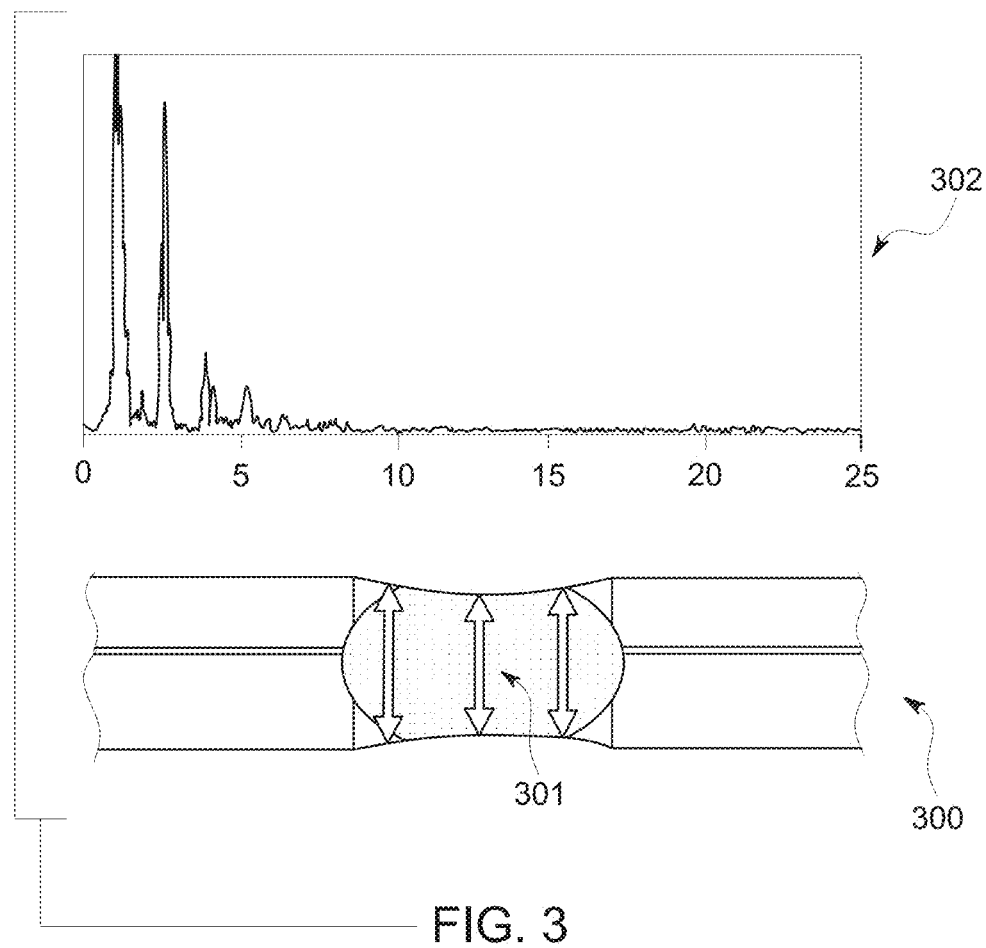

FIG. 3 depicts a burned connection 301 detected in an object 300 under inspection and an A-scan 302 displayed on a user interface of a non-destructive test system. As depicted, the burned connection is characterized by full penetration of the weld into the object 300, generally caused by excessive melting of the object. Conventional single transducer systems can detect defects such as the burned connection 301. As depicted in the A-scan (302) of FIG. 3, burned welds can be detected by identifying a very short echo sequence which does not show multiple reflections of the total stack thickness.

Figure 4:
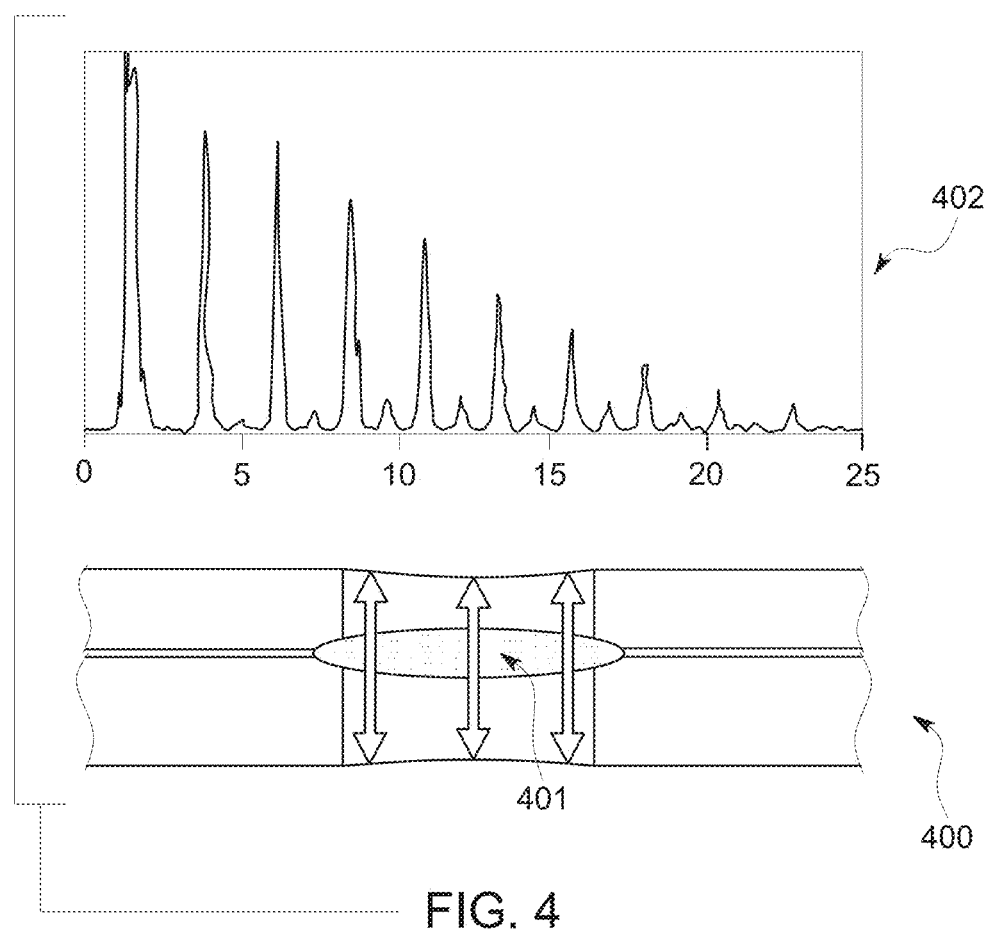

FIG. 4 depicts a bad through weld 401 detected in an object 400 under inspection and A-scan 402 displayed on a user interface of a non-destructive test system. The bad through weld 401 is characterized by the two layers of the object 400 being not completely fused after the welding process. Conventional single transducer systems can detect defects such as bad through weld 401. The bad through welding defect occurs if not the full material of the spot weld was melted and fused together. As depicted in the A-scan 402 of FIG. 4, bad through welding can be detected by identifying additional echo amplitudes with smaller amplitude in between the echo sequence of the total stack thickness.

Figure 5:
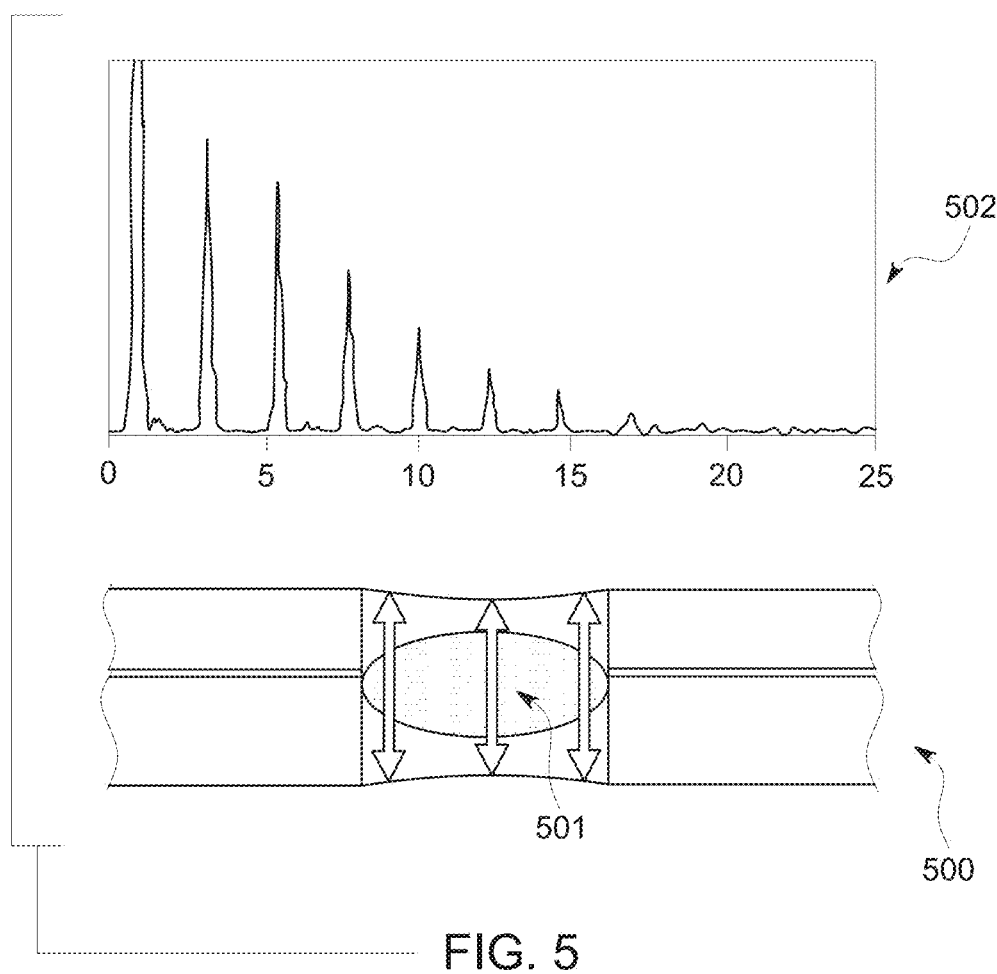
FIGS. 5-6 depict spot-weld features detected by an embodiment of a phased array probe, in accordance with one or more aspects set forth herein.
Figure 6:
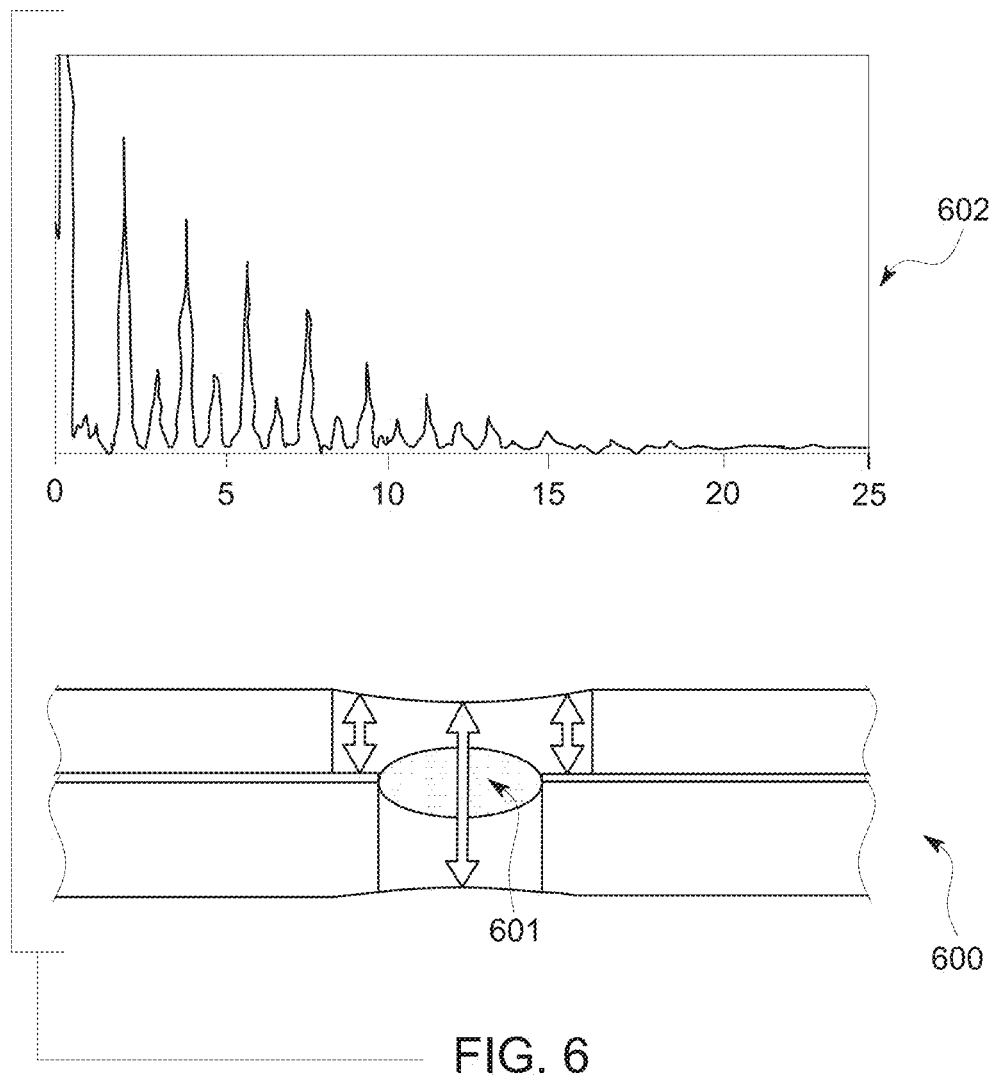

Next FIGS. 5-6 depict weld nuggets that have specified smallest diameters. Because the nuggets are three-dimensional objects, FIGS. 5-6 depict a representative cross-section. Notably, during a welding process, a target diameter of the weld nugget is sought, and the testing methods depicted herein may be used to validate whether or not the target has been achieved.

FIG. 5 depicts an ok or acceptable weld having an acceptable nugget 501 detected in an object 500 under inspection, and displayed on a user interface 502 of a non-destructive test system. As depicted in FIG. 5, the acceptable weld is characterized by an acceptable nugget 501 that demonstrates penetration well into both layers of the object 500, to create a solid weld connection that has a minimum diameter of the target D.

FIG. 6 depicts a small nugget 601 detected in an object 600 under inspection, and displayed on a user interface 602 of a non-destructive test system. By contrast with the nugget 501, here the nugget 601 is not the full dimension D that was intended during the welding process. Instead, the minimum diameter of the nugget 601 is d. Because d<<D, this nugget 601 is too small in comparison with the target diameter.

Figure 7A:
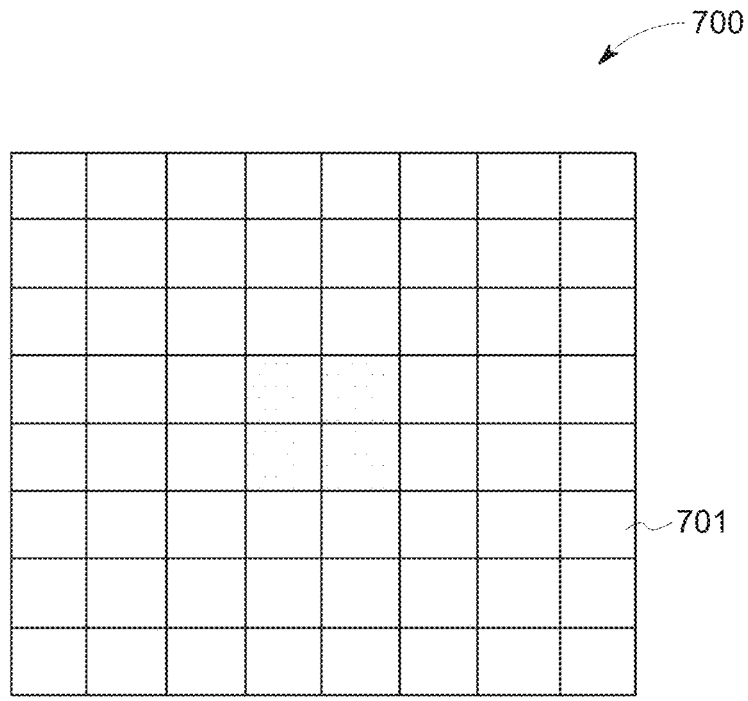
FIG. 7A depicts an ultrasonic matrix phased array system with four central active transducers for testing an object or surface, in accordance with one or more aspects set forth herein.
Figure 7B:
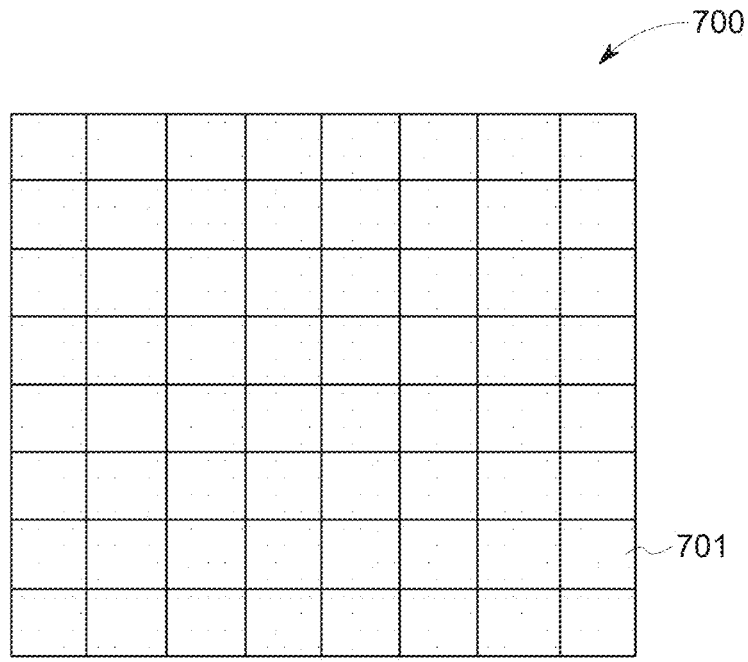
FIG. 7B depicts the ultrasonic matrix phased array system of FIG. 7A with all transducers active for testing an object or surface, in accordance with one or more aspects set forth herein.

Next, different exemplary phased array probes are set forth for use in the method and system described herein. FIG. 7A depicts an ultrasonic matrix phased array probe 700 with four central active transducers 702 out of an 8×8 array of individual transducers 701. FIG. 7B depicts an ultrasonic matrix phased array probe 700 with all active transducers out of the 8×8 array of individual transducers 701.

Specific details of ultrasonic transducers in phased array probes are generally known. Reference for further details is made to U.S. Pat. No. 9,110,000 B2, published on Aug. 18, 2015, which is incorporated herein in its entirety.

Figure 8:
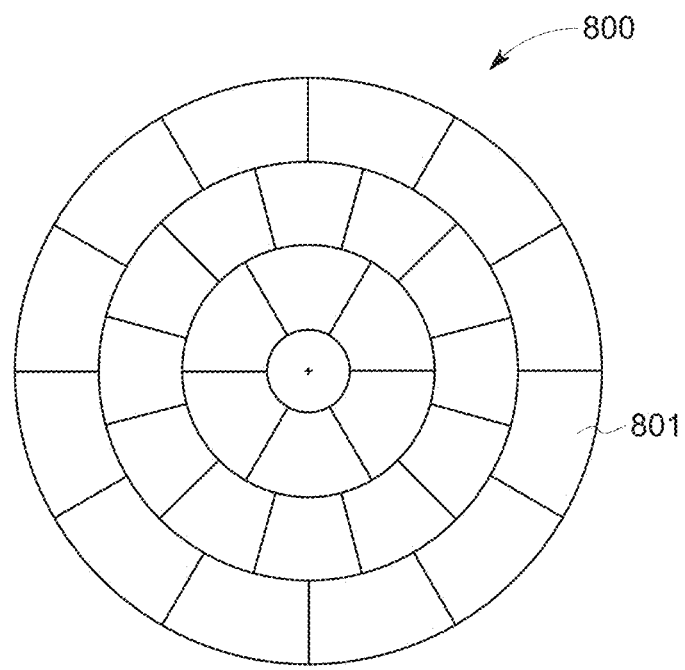
FIGS. 8-9 depict ultrasonic segmented annular phased array systems, in accordance with one or more aspects set forth herein.
Figure 9:
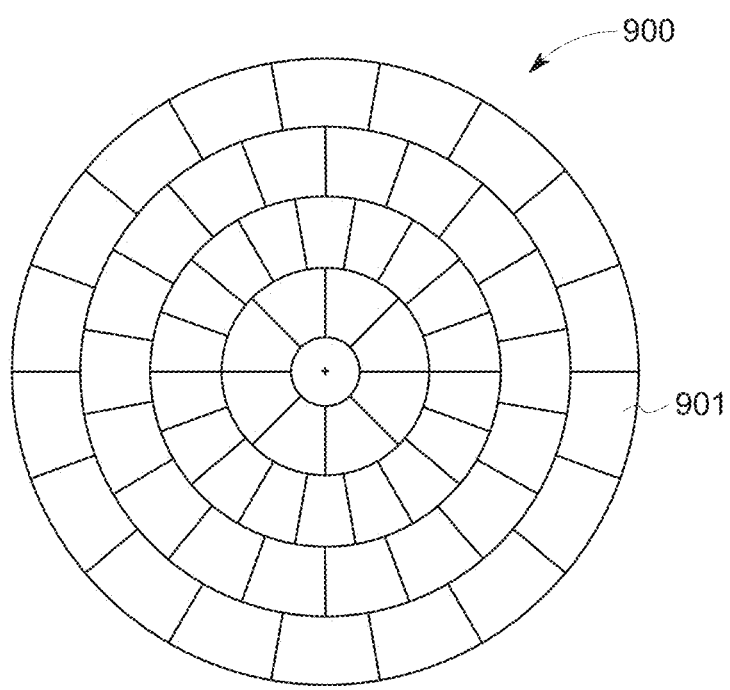

In addition to rectangular arrays, circular arrays may be used in the present technique. FIG. 8 depicts an ultrasonic phased array probe 800 having 31 individual transducers 801, which are disposed in an annular, circular fashion, with a central transducer 802. FIG. 9 depicts an ultrasonic segmented annular phased array probe 900 having 63 individual transducers 901, which are disposed in an annular, circular fashion, with a central transducer 902. With the probes 800 and 900, not all transducers must be activated. Instead, in certain operations, a central transducer may be operated, and in other operations, some subset of the other transducers may be operated.

Figure 10:
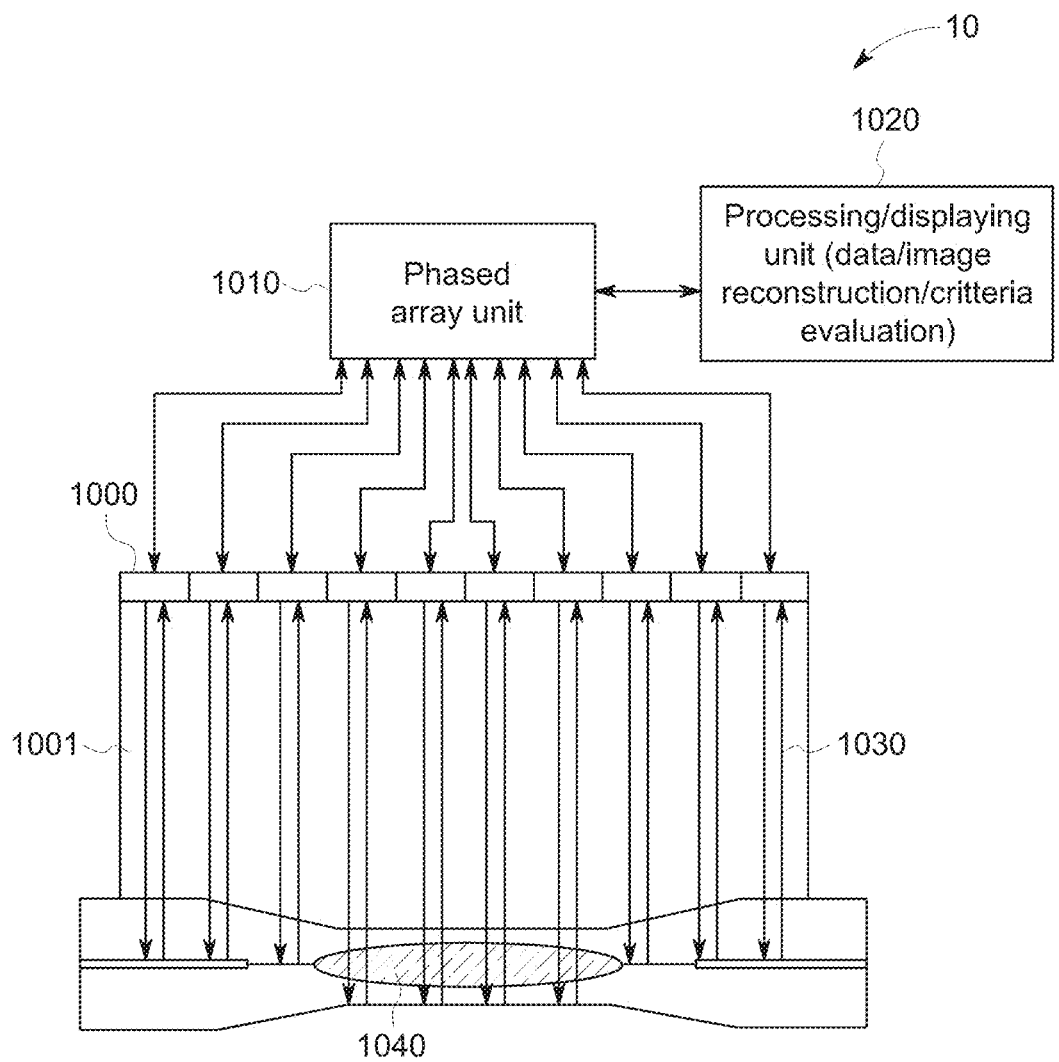
FIG. 10 is a block diagram showing the primary components of an ultrasonic phased array spot weld inspection, in accordance with one or more aspects set forth herein.

FIG. 10 is a block diagram showing the primary components of an ultrasonic phased array spot weld inspection 10 in accordance with an exemplary embodiment of the present invention. An ultrasound phased array system for inspection of resistance spot-welds can determine the minimum nugget diameter with a high resolution, accuracy and reproducibility. The system may not only able to determine the nugget diameter, but also to identify other spot-weld defects such as stick welds, burned spot-welds, bad though welding and loose welding with a sub-aperture of the phased array probe. The system can employ an image reconstruction algorithm, for example TFM (Total Focusing Method) (described below) to generate a color-coded image of the nugget either based on reflection amplitude values or time-of-flight measurement. The system may consist of a phased array transducer with individual transducer elements 1000, a flexible delay line 1001, and phased array ultrasonic testing (PAUT) electronics 1010 able to send and receive the signals from the phased array transducer, and a processing/displaying unit 1020 able to run the reconstruction algorithm, display the reconstructed image and/or employ an automatized identification of the spot-weld condition resulting in pass/fail criteria. The PAUT electronics 1010 and processing/displaying unit 1020 may either be realized in a single instrument or two separate instruments.

Continuing with FIG. 10, during positioning of the probe on the spot-weld the central transducer elements of the array can be used in a single shot to perform an inspection which is close to the conventional single element probe inspection. In addition, all elements of the phased-array transducer, which could be realized as a matrix array 700 or a segmented annular array (with for example either 31 elements 800 or 63 elements 900) to represent the rotational symmetric geometry of the spot-welds can be employed to display an active C-scan on the processing/displaying unit 1020 to guide the operator or provide input to a feed-back loop for a possible automatized system in the positioning of the probe. Using the signals from the central aperture, an optimal position of the probe with respect to the spot-weld is obtained, based on a maximum amplitude automatized criteria in the processing unit. This triggers the actual data acquisition of the processing unit and evaluates the different pass/fail criteria.

As shown previously in FIGS. 7A-9, using the central elements of the phased array transducer (sub-aperture) an initial set of measurements and criteria are checked which can determine 1) stick welds by measuring the remaining wall thickness 2) loose spot-welds, 3) bad though-welding and/or 4) burned spot-welds. These criteria can be the same or similar to the conventional testing performed nowadays. The choice of a central aperture to generate a single transducer thus encompasses the conventional single element probe inspection in the phased-array approach.

Returning now to FIG. 10, in a second step, all elements of the phased-array transducer are used to collect the ultrasound signals 1030 in a FMC (Full matrix capture) approach. The TFM image reconstruction algorithm, which generates the color-coded image of the nugget 1040 on the processing/displaying unit, 1020 then uses this data set. A possible benefit of a TFM reconstruction algorithm is that it can provide a much higher resolution and thus higher accuracy and reproducibility of the minimal nugget diameter or 2-dimensional area of fusion when compared to direct or interpolated C-scans of a matrix array transducer, leading to more reliable and accurate inspection results. Once the image is reconstructed an automatized algorithm determines the minimal valid nugget diameter or 2-dimensional area of fusion either based on amplitude or time-of-flight values.

The system may provide automatized on-line feedback based on multiple pass/fail criteria for whether the spot weld is likely to pass or fail the test. The operator may decide whether to accept or ignore the result of the automatized algorithms. The full data set of the spot-weld with all relevant parameters may be stored in the processing/displaying units for later quality control.

Figure 11A:
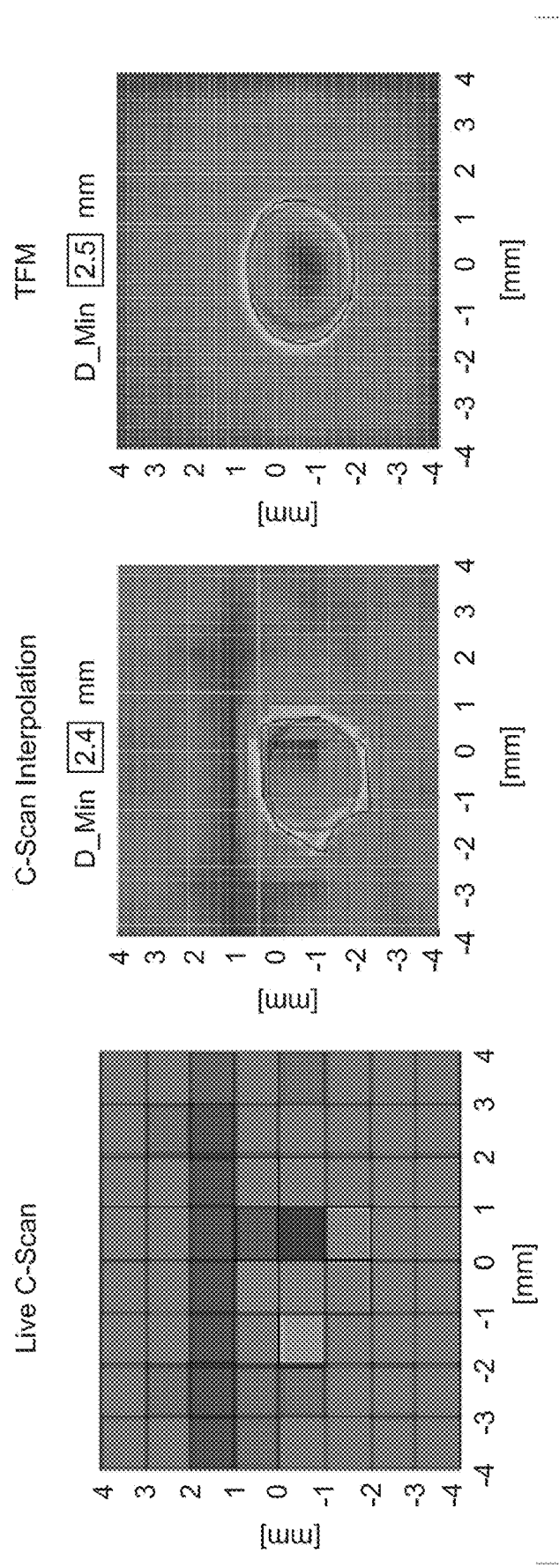
FIGS. 11A and 11B depict non-destructive inspection and detection of features, in accordance with one or more aspects set forth herein.

Next, FIG. 11A is a graph showing non-destructive inspection and detection of features, specifically of a test-block with a 3 mm FBH in 1.5 mm depth. The depth of 1.5 mm is close to a typical 2 stack sheet thickness and a 3 mm diameter is at the lower end of typical spot-weld diameters. The left-hand portion shows a live C-scan in which the FBH cannot be clearly identified, the middle portion shows a C-scan interpolation with a slightly improved resolution of the FBH, and the right hand portion shows a total focusing method (TFM) output. The parameters of this example are: Matrix Array 1 mm×1 mm pitch; 15 MHz; 64 Elements; one matrix row dead, immersion. As may be seen in FIG. 11A, the TFM output demonstrates an improved image of the 3 mm FBH with higher resolution, when compared with either of the C-scan images. This improved resolution leads to a more accurate measurement of the FBH diameter. The FBH diameter is automatically determined from the minimal radius of a circle which can be placed inside the black contour lines in the C-Scans which mark the edges of the reconstructed FBH. The FBH diameter determined from the interpolated C-Scan and TFM C-Scan is provided as the D_Min Value above each C-Scan in FIG. 11A. That the TFM C-Scan does not match the 3 mm Diameter of the FBH under test is a result of the dead element-row in the used matrix array. However, by comparing the black contour lines in the C-Scans which mark the edges of the reconstrued FBH image it becomes clear that the TFM C-Scan images has much better resolution and in case of a fully functional Matrix array would give the correct FBH diameter under test.

Figure 11B:
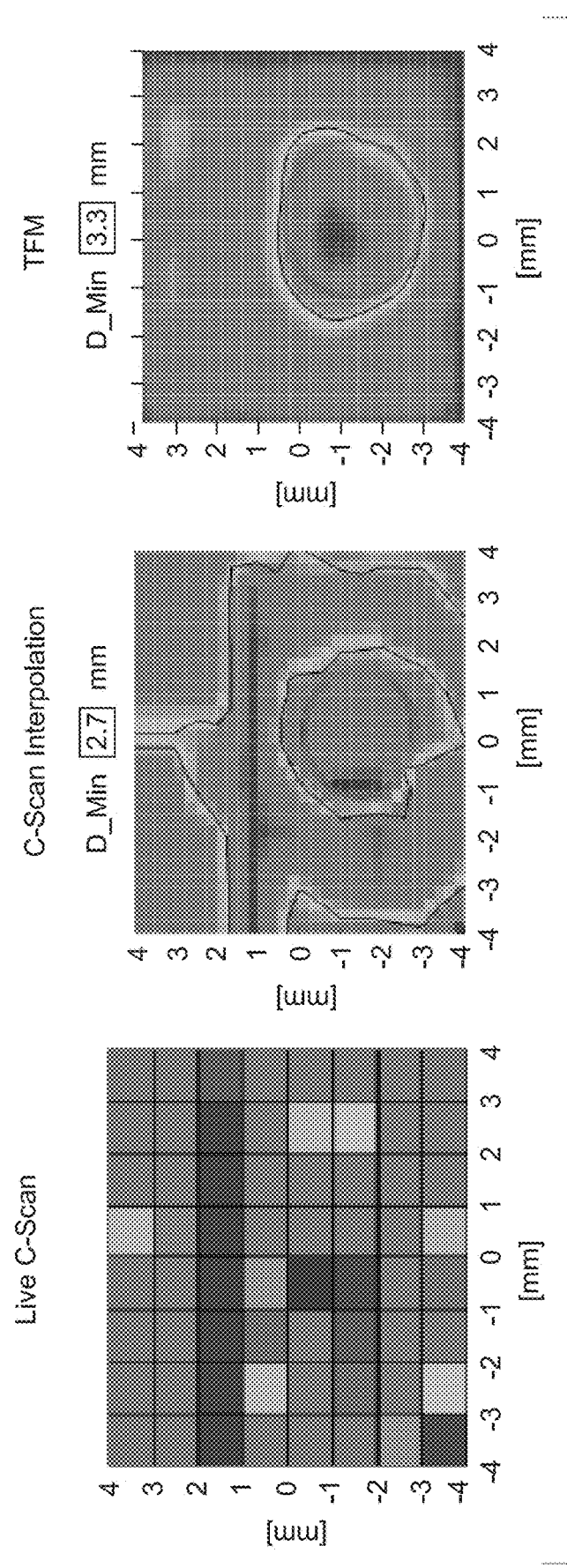

Continuing, FIG. 11B is a graph showing non-destructive inspection and detection of features, specifically of the nugget 1040 of FIG. 10. The left-hand portion shows a live C-scan in which the contour of the nugget diameter cannot be clearly identified, the middle portion shows a C-scan interpolation in which the contour of the nugget diameter can be identified with low resolution, and the right-hand portion shows a total focusing method (TFM) output in which the contour of the nugget diameter can be clearly identified with high resolution. The parameters of this example are: Matrix Array 1 mm×1 mm pitch; 15 MHz; 64 Elements; one matrix row dead, immersion; Spot-weld sample, diameter unknown. As may be seen in FIG. 11A, the TFM output demonstrates an improved image nugget diameter with higher resolution, when compared with either of the C-scan images. This improved resolution leads to a more accurate measurement of the nugget diameter. The nugget diameter is automatically determined from the minimal radius of a circle which can be placed inside the black contour lines in the C-Scans which mark the edges of the reconstructed nugget. The minimal nugget determined from the interpolated C-Scan and TFM C-Scan is provided as the D_Min Value above each C-Scan in FIG. 11A. By comparing the black contour lines in the C-Scans which mark the edges of the reconstrued FBH image it becomes clear that the TFM C-Scan images has much better resolution and in case of a fully functional Matrix array would likely provide the correct nugget diameter under test. By comparing the D_Min values from the interpolated C-Scan and the TFM C-Scan it becomes clear that an interpolation algorithm would likely undersize the minimal nugget diameter, whereas the TFM result provide as more accurate value of the minimal nugget diameter In the examples of FIGS. 11A and 11B, the following experimental results were determined, demonstrating the advantages of the present technique. TFM algorithm computation time on processing unit: 2-3 s; TFM reconstructed image has much higher resolution than the interpolated C-Scan (current market available solution). TFM algorithm is more capable in determining the minimal spot-weld nugget diameter (compromised by dead row of elements in the validation test). Typical reconstruction resolution of TFM algorithm: 0.2 mm.

Figure 12:
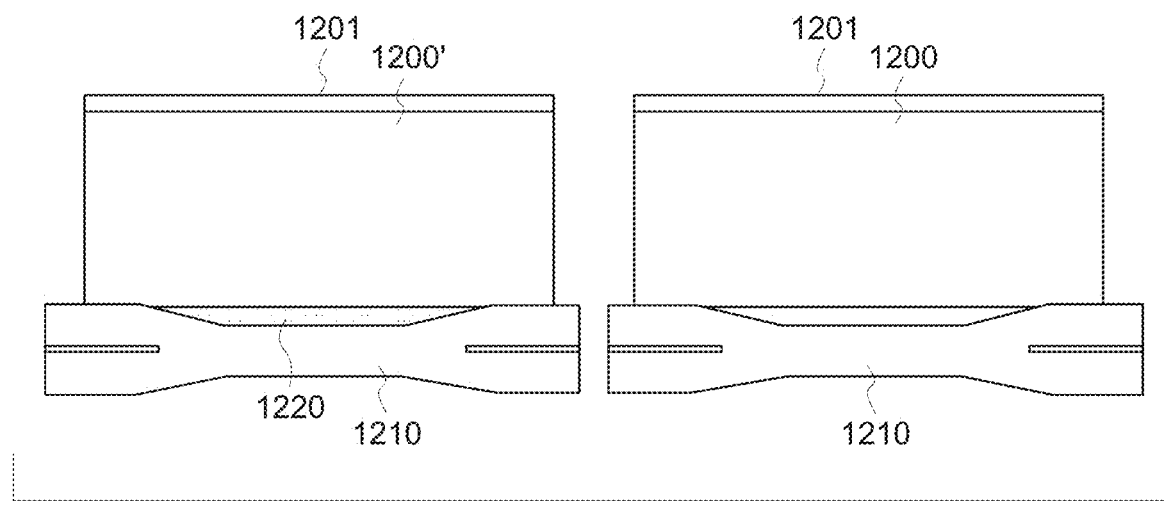
FIG. 12 depicts apparatuses for non-destructive testing, in accordance with one or more aspects set forth herein.

FIG. 12 depicts an apparatus for non-destructive testing of an object 1210. In one example, a first apparatus includes a transducer array 1201 and a flexible delay line 1200. In another example, a second apparatus includes a transducer array 1201 and a fixed hard delay line 1200'. Given the geometry of the spot-weld area which have usually an indent and a non-flat coupling surface, the flexible delay line which could be realized by a flexible rubber or a fluid (e.g. water) filled chamber, can be optimally coupled to the spot-weld under inspection, and the orientation of the probe to the spot-weld can be adjusted, to maximize the reflection amplitude which can ensure a perpendicular orientation of the probe to the spot-weld.

By way of overview of FIG. 12, the use of an advanced reconstruction algorithm may provide improved reconstruction resolution than can be obtained with conventional solutions. In addition, the TFM method can be realized with a phased-array probe with fewer elements e.g. 32 or 64, while providing better resolution when compared to market available solutions, which can allow for a more compact and comfortable design of the phased array probe and thus is also applicable in space constrained areas which are common for spot-weld inspections. Since the TFM method maps the full inspection volume it can also be capable of identifying the minimal spot-weld nugget diameter in the case of misplaced welds, which is not easily achievable with a straight beam inspection as performed by current market available solutions.

The flexible delay line of the system can allow an optimal coupling to the area of the spot-weld, and an optimization of the probe's position which can significantly increase the reliability and reproducibility of the inspection results which are currently not achievable with the hard delay lines of conventional solutions.

Of further note, the present technique may also allow not only storage and documentation of the resulting reconstruction images of the spot-weld nugget or 2-dimensional are of fusion, but could also allow storage of the full A-Scan data which could be stored on a server/cloud for further post-processing or more dedicated analyses of the spot-weld geometry. Thus the phased array (PA) approach also allows for a comprehensive documentation of the testing results and archiving.

Figure 13:
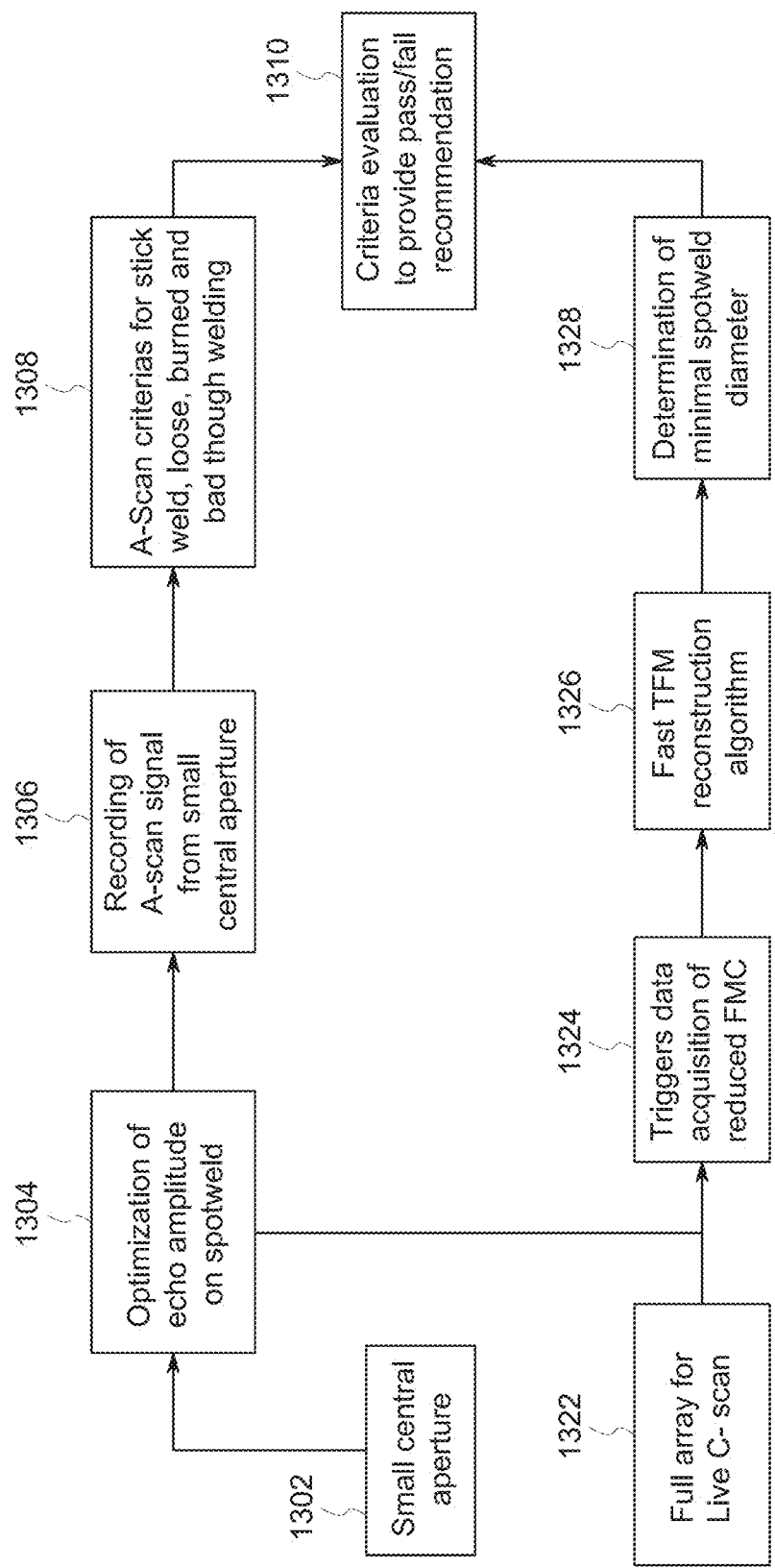
FIG. 13 depicts a method for non-destructive testing, in accordance with one or more aspects set forth herein.

FIG. 13 depicts a method for non-destructive testing, in accordance with one or more aspects set forth herein. In a first flow, at block 1302, a small central aperture is selected. At block 1304, echo amplitude is optimized on a spot-weld. At block 1306, A-scan signal from small central aperture is recorded. At block 1308, A-Scan criteria for stick weld, loose, burned and bad though welding are determined. At block 1310, criteria is evaluated to provide pass/fail recommendation.

Continuing with FIG. 13, in a second flow, at block 1322, a full array for live C-scan is selected. At block 1324, data acquisition of reduced FMC is triggered after the echo is optimized on the spot weld from block 1304. At block 1326, the fast TFM reconstruction algorithm is run. At block 1328, minimal spot-weld diameter is determined. At block 1310, criteria is evaluated to provide pass/fail recommendation.

Turning next to further details of the total focusing methods, one embodiment of a novel algorithm is presented herein.

Full Matrix Capture and Total Focusing Method

The Full Matrix Capture (FMC) of ultrasonic array transducers with N elements consists in recording the full A-Scan dataset of N×N $s_{ij}(t)$ where j ($1<j<N$) are transmitting and i ($1<i<N$) are receiving elements. Where $s_{ij}(t)$ is a single recorded A-Scan of the transmitter and receiver combination. The transmitting and receiving elements can either be a single element or a multiplicity of elements of the array or a combination of these. If a multiplicity of elements is used as transmitter or receiver respectively the ultrasonic sound field these transmitters and receivers could be steered or focused at a certain point to enhance signal quality by employing single element delay laws during transmit and receive. This signal matrix $S(t)=s_{ij}(t)$ is the basis of the TFM reconstruction. The signal amplitude A(P) at a specific point in the reconstructed image is given by:

$$A(P) = \left| \sum_{\substack{1 \le i \le N \\ 1 \le j \le N}} s_{ij}(t_{ij}^P = t_i^P + t_j^P) \right|$$

Where $t_i^P$ (resp. $t_j^P$) is the time of flight between the receiver i (resp. transmitter j) and point P.

Hence to reconstruct a single point P in the TFM image with a 64 element probe a total of $N \times N = 64 \times 64 = 4096$ summations have to be made. In addition 4096 time of flight calculations for each $t_i^P$ and $t_j^P$ have to be made. Considering the imaging of a volume of X: 8 mm×Y: 8 mm×Z: 1 mm with a reasonable resolution for inspecting spot-welds at the needed ultrasound frequencies of 15 MHz and above ($\Delta x=0.25$ mm; $\Delta y=0.25$ mm; $\Delta z=0.02$ mm) yields a total number of $N \times N \times X/\Delta x \times Y/\Delta y \times Z/\Delta z$ ($64 \times 64 \times 32 \times 32 \times 50 = 2097155200$) summations of signals $s_{ij}(t)$ and time of flight computations.

The time of flight calculation is based on finding the root of a square root function, which takes into account the position of the element with respect to the reconstruction point, the sound velocity of the probes delay material and the sound velocity of the material under test. Since Snell's law governs the propagation of ultrasound at the interface of two media, the square root function involves trigonometric functions to be calculated. The numerical calculation of trigonometric functions and root finding algorithms is particularly computationally time consuming.

Reduced Full Matrix Capture and Fast Total Focusing Method

In order to significantly reduce the calculation time and bring it to an acceptable level for the inspection of spot-welds (2-3 seconds compared to several minutes) the following optimizations have been implemented in the enhanced TFM reconstruction algorithm.

The first change is that only the relevant signals are acquired in the FMC and used in the TFM reconstruction algorithm. It may be shown that for reconstructing the signal A(P) at a given point only the transmitting elements in a constrained area/radius around the reconstruction point are sufficient to obtain a good reconstruction of the signal amplitude A(P). In addition, only receiving elements which are within the constrained area/radius contribute significantly to the reconstruction amplitude A(P). As an example let us consider a 64 element Matrix array with a 1 mm×1 mm pitch and an active reconstruction aperture of 7 mm×7 mm, i.e. 49 elements which are used in the reconstruction the amount of summations is reduced to 1385, resulting in a computation time reduction of a factor of approximately 3 for a central point in the image with respect to 4096 summations when employing all 64 elements. Since reconstruction points further out to the edges of the image have less and less elements in the active reconstruction aperture the reduction factor increases even more for reconstructing the full image. For the example mentioned above to image a volume of $8 \times 8 \times 1$ mm$^3$ the total amount of calculations is reduced to 14154640 compared to 2097155200 when employing all 64 elements yielding a reduction factor in computation time of about 150. To speed the computation up even more, two additional features can be employed. First the transducer array could be designed such that it reflects the area of interest in the reconstruction. For inspecting spot-welds this would mean to employ a dedicated design of a segmented annual array to take advantage of the rotational symmetry in this specific application reducing the number of needed reconstruction points in the volume. In addition, the signals from each element stored in the position $s_{ij}(t)$ can be used to check for the validity of the reconstruction area right below the element. If significant reflections from the single joint sheets can be detected this area should not be considered in the TFM reconstruction. In addition, since only the signals of receiving elements, which are within the constrained area, are considered in the calculations, the number of signals, which have to be stored during the FMC, reduces as well. Thus the number of needed delay-laws for the FMC is reduced which enables an implementation of the algorithm on a portable system.

One of the main computation time consuming operations is the calculation of the time of flight values for each of the above calculated summations. To overcome this limitation in processing speed in the TFM reconstruction a pre-calculated delay times are used in the reconstruction algorithm. These pre-calculated delay times are typically stored in a look-up table on the processing unit for a predefined range of the delay line, constrained reconstruction area and reconstruction depth in the material. The during the summations needed time of flight $t_i^P$ and $t_j^P$ is then drawn from the pre computed time of flight look-up table T(d,R,Z), where d is the delay of the elements i (resp. j) determined during the TFM reconstruction from the interface echo position of the signal $s_{ii}(t)$ (resp. $s_{jj}$); R is the radial distance of elements i (resp. j) to the reconstruction point P and Z is the depth of the reconstruction point P in the material. It has been shown that the usage of this look-up table approach is valid when the transducer array is positioned mostly parallel to the reflecting surface of the spot-weld (reflection from the joined sheet stack in the area of the spot-weld). The parallelism of the transducer array to the reflecting surface of the spot-weld is ensured by the maximization of the signal from the small central aperture of the array which is fired first during the inspection and triggers the data acquisition (see description of acquisition and processing algorithm for details).

In order to take into account the surface geometry of the spot weld the delays used in the fast TFM reconstruction may depend on the position of the reconstruction point with respect to the transmitting and receiving elements. The delays of the interface echo positions of the signals $s_{ii}(t)$ (resp. $s_{jj}$) maps the coupling surface with a resolution of the element size. In the reconstruction algorithm, the delay of the element nearest to the reconstruction point may be checked against the delays of the transmitting and receiving elements. If the delay of the nearest element is less than the delay of the transmitting or receiving element the actual delays of the receiving and transmitting element are used. If this criterion is not fulfilled the delay of the nearest element is used. This processing thus considers the surface geometry of the coupling area as measured by the delays of the single elements. It can be shown that this approach is sufficient for the inspection of spot-welds for which only points close to the inspection surface have to be reconstructed.

In a more sophisticated approach the coupling surface could also be mapped in a higher resolution by the same TFM algorithm. Once the coupling surface is reconstructed the time of flight from transmitting elements j or receiving elements i to each single reconstruction point passing the surface s(x,y) could be calculated using Fermat's principle by minimizing the following function:

$$t_k^P(x, y) = \frac{\sqrt{(x-x_k)^2 + (y-y_k)^2 + s(x, y)^2}}{v_1} + \frac{\sqrt{(x-x_P)^2 + (y-y_P)^2 + (z_P - s(x, y))^2}}{v_2}$$

x and y are the coordinates of the surface impact point, while $x_k$ and $y_k$ are the coordinates of the considered elements k, where k can be transmitting elements j or receiving elements i, $x_P$, $y_P$ and $z_P$ are the coordinates of the reconstruction point, s(x,y) is the surface profile and $v_1$ and $v_2$ are the sound velocities in the delay (1) and the tested material (2). The minimization of the function must be done once for the transmitting and once for the receiving elements. The numerical calculation of the impact point coordinates x and y could be done by an efficient minimization algorithm implemented in software. Since these calculations must be performed for each signal summation in real-time or in an offline postprocessing such an approach would significantly increase the computation time. For challenging inspections, however for which the mapping of the coupling surface by the delays of the interface echoes of the single elements is not sufficient, this approach could offer additional benefits in reconstruction reliability.

Although all the optimizations to the general TFM method described above are necessary to obtain the reconstruction speed for an industrial implementation of this inspection approach, the above embodiments are only one possible implementation of the TFM method for inspecting spot-welds with a matrix or segmented annular phased array probe. Other embodiments such as a system employing the general TFM method with a matrix or segmented annular phased array probe for the inspection of spot-welds are within the scope of the disclosed subject matter.

The optimization of the TFM method using pre-calculated look-up tables for the relevant delay times are necessary to obtain the speed for an industrial implementation of this inspection approach, the above embodiments are only one possible implementation of the TFM method for inspecting spot-welds with a matrix or segmented annular phased array probe. Other embodiments such as a system employing algorithms for a real-time calculation of the delays times with a matrix or segmented annular phased array probe for the inspection of spot-welds are within the scope of the disclosed subject matter.

Spot-Weld Inspection and Processing Algorithm

The inspection and processing algorithm consists of multiple steps. In the acquisition mode, the array may be utilized in two modes. Once the full array is used in a live C-Scan imaging for positioning the probe on the spot-weld, in parallel a small central aperture may be utilized to optimize the echo of the reflecting surface of the spot-weld to ensure parallelism of the transducer array and the spot-weld. These two modes can be run on the acquisition unit in parallel by electronically activating single elements or a subgroup of elements. Once the reflecting echo is optimized (defined by an user defined threshold) the A-Scan from the central aperture is automatically stored and the data acquisition of the reduced FMC is triggered. The criteria for stuck welds, loose, burned and bad though welding is checked on the single A-Scan from the central aperture to assess possible weld defects. In parallel the TFM algorithm may be ran on the acquired FMC dataset to calculate the reconstructed minimal spot-weld diameter. All criteria (stuck weld, loose, burned bad though welding and minimal diameter) are checked and a pass/fail recommendation is provided to the inspector by displaying the result on the displaying unit (see block chart of the inspection and processing algorithm).

For determining the real spot-weld diameter it may be necessary to run the TFM algorithm in two material depths. The first reconstruction would run in a depth of the total material thickness as determined from the central aperture A-Scan. A second TFM reconstruction would be run at a material depth which would correspond to the total material depth plus the top sheet thickness to check for any loose areas within the inspection region. Only points for which there is a significant signal at the total sheet thickness (1st TFM reconstruction) and no significant signal at the material depth of the $2^{nd}$ TFM reconstruction would be considered as valid points for determining the minimal spot weld diameter.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In view of the foregoing, embodiments of the enable non-destructive testing and processing of test results to reach conclusions such as pass/fail criteria of, e.g., a spot-weld. A technical effect is the accurate measurement of nugget diameters of spot-weld or the accurate measurement of a 2D area of a fusion with a TFM algorithm. A second technical effect is to reduce the required processing time of a TFM algorithm, enabling the deployment of portable manual or in-line automatized apparatuses in the field.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for testing a spot-weld on a structure using a segmented annular phased array probe, the method comprising:
    positioning the segmented annular phased array probe at a first position on the structure relative to the spot-weld, the segmented annular phased array probe including a plurality of transducers;
    generating first generated ultrasonic signals to and receiving first received ultrasonic signals from the spot-weld using the plurality of transducers of the segmented annular phased array probe;
    processing the first received ultrasonic signals from the plurality of transducers of the segmented annular phased array probe to determine a first C-scan image having a first resolution and including a second position on the structure, the second position included within the first C-scan image and determined relative to the spot-weld;
    generating second generated ultrasonic signals to and receiving second received ultrasonic signals from the spot-weld using the plurality of transducers of the segmented annular phased array probe based on the second position;
    processing the second received ultrasonic signals from the plurality of transducers of the segmented annular phased array probe to determine a reconstruction image of the first C-scan image at the second position, the reconstruction image determined for a plurality of reconstruction points via an image reconstruction algorithm employing a total focusing method and pre-calculated delay time values associated with time of flight values corresponding to the second received ultrasonic signals received from a first reconstruction point of a first area and a second reconstruction point of a second area radially distant from the first reconstruction point of the first area, wherein reconstruction image is determined based on the first reconstruction point of the first area and excludes the second reconstruction point of the second area, wherein the pre-calculated delay times are further associated with a reconstruction depth of the structure at the first reconstruction point and the reconstruction image includes a second resolution higher than the first resolution and also includes a reconstruction of a feature dimension of the spot-weld; and
    providing the reconstruction image within a color-coded second C-scan image in a display in real-time.

2. The method of claim 1, wherein the segmented annular phased array probe comprises a flexible delay line, and positioning and repositioning the phased array probe comprise coupling the segmented annular phased array probe to the structure using the flexible delay line.

3. The method of claim 1, wherein processing the second received ultrasonic signals comprises using an equation of the form $$A(P) = \left| \sum_{\substack{1 \le i \le N \\ 1 \le j \le N}} s_{ij}\left(t_{ij}^P = t_i^P + t_j^P\right) \right|,$$

where:
- A(P) is a signal amplitude at a point P in the reconstruction image;
- $s_{ij}(t)$ is a signal matrix of signals received from the plurality of transducers, where j (1<j<N) are transmitting and i (1<i<N) are receiving elements; and
- $t^P_i$ (resp. $t^P_j$) is a time of flight between the receiver i (resp. transmitter j) and point P.

4. The method of claim 3, wherein the time of flight between the receiver and the transmitter is determined using an equation of the form $$t^P_k(x, y) = \frac{\sqrt{(x-x_k)^2 + (y-y_k)^2 + s(x,y)^2}}{v_1} + \frac{\sqrt{(x-x_P)^2 + (y-y_P)^2 + (z_P - s(x,y))^2}}{v_2},$$

where:
- x and y are the coordinates of the surface impact point, while $x_k$ and $y_k$ are the coordinates of the considered elements k, where k can be transmitting elements j or receiving elements i, $x_P$, $y_P$ and $z_P$ are the coordinates of the first reconstruction point, s(x,y) is the surface profile and $v_1$ and $v_2$ are the sound velocities in the delay ($v_1$) and the tested material ($v_2$).

5. The method of claim 1, wherein the plurality of transducers of the segmented annular phased array probe comprises at least one first transducer surrounded by second transducers.

6. The method of claim 5, wherein the second transducers comprise a subset of the plurality of transducers, the second transducers selected to surround the spot weld.

7. The method of claim 5, wherein the second transducers comprise a subset of the plurality of transducers, the ultrasonic sound field second transducers are steered or focused at a certain point to enhance signal quality using single element delay law calculation during transmit and receive of the ultrasonic signals.

8. The method of claim 1, wherein generating the second generated ultrasonic signals comprises generating signals at a first probe depth and a second probe depth, and the processing the second received ultrasonic signals comprises determining the feature dimension at the first probe depth and the second probe depth.

9. A phased array probe system for testing a spot-weld on a structure, the system comprising:
- a display; and
- a segmented annular phased array probe coupled to the display, the segmented annular phased array probe comprising:
  - a plurality of transducers;
  - a flexible delay line for coupling the segmented annular phased array probe to the structure;
  - wherein the plurality of transducers generates first generated ultrasonic signals to and receives first received ultrasonic signals from the spot-weld at a first position on the structure relative to the spot-weld;
  - wherein the plurality of transducers generates second generated ultrasonic signals to and receive second received ultrasonic signals from the spot-weld based on a second position on the structure relative to the spot-weld; and
- a processor, the processor configured for:
  - processing the first received ultrasonic signals from the plurality of transducers of the segmented annular phased array probe to determine a first C-scan image having a first resolution and including the second position on the structure, the second position included within the first C-scan image and determined relative to the spot-weld; and
  - processing the second received ultrasonic signals from the plurality of transducers of the segmented annular phased array probe to determine a reconstruction image of the first C-scan image, the reconstruction image determined for a plurality of reconstruction points via an image reconstruction algorithm employing a total focusing method and pre-calculated delay time values associated with time of flight values corresponding to the second received ultrasonic signals received from a first reconstruction point of a first area and a second reconstruction point of a second area radially distant from the first reconstruction point of the first area, wherein reconstruction image is determined based on the first reconstruction point of the first area and excludes the second reconstruction point of the second area, wherein the pre-calculated delay times are further associated with a reconstruction depth of the structure at the first reconstruction point and the reconstruction image includes a second resolution higher than the first resolution and also includes a reconstruction of a feature dimension of the spot-weld; and
  - providing the reconstruction image within a color coded second C-scan image in the display in real-time.

10. The system of claim 9, wherein processing the second received ultrasonic signals comprises using an equation of the form $$A(P) = \left| \sum_{\substack{1 \leq i \leq N \\ 1 \leq j \leq N}} s_{ij}(t^P_{ij} = t^P_i + t^P_j) \right|,$$

where:
- A(P) is a signal amplitude at a point P in the reconstruction image;
- $s_{ij}(t)$ is a signal matrix of signals received from the plurality of transducers, where j (1<j<N) are transmitting and i (1<i<N) are receiving elements; and
- $t^P_i$ (resp. $t^P_j$) is a time of flight between the receiver i (resp. transmitter j) and point P.

11. The system of claim 10, wherein the time of flight between the receiver and the transmitter is determined using an equation of the form $$t^P_k(x, y) = \frac{\sqrt{(x-x_k)^2 + (y-y_k)^2 + s(x,y)^2}}{v_1} + \frac{\sqrt{(x-x_P)^2 + (y-y_P)^2 + (z_P - s(x,y))^2}}{v_2},$$

where:
- x and y are the coordinates of the surface impact point, while $x_k$ and $y_k$ are the coordinates of the considered elements k, where k can be transmitting elements j or receiving elements i, $x_P$, $y_P$ and $z_P$ are the coordinates of the first reconstruction point, s(x,y) is the surface profile and $v_1$ and $v_2$ are the sound velocities in the delay ($v_1$) and the tested material ($v_2$).

12. The system of claim 9, wherein the plurality of transducers of the segmented annular phased array probe comprises at least one first transducer surrounded by second transducers.

13. The system of claim 12, wherein the at least one first transducer is at least one first central transducer and the second transducers are disposed concentrically to the at least one first central transducer.

14. The system of claim 12, wherein the second transducers comprise a subset of the plurality of transducers, the second transducers selected to surround the spot weld.

15. The system of claim 12, wherein the second transducers comprise a subset of the plurality of transducers, the ultrasonic sound field second transducers are steered or focused at a certain point to enhance signal quality using single element delay law calculation during transmit and receive of the ultrasonic signals.

16. The system of claim 9, wherein generating the second generated ultrasonic signals comprises generating signals at a first probe depth and a second probe depth, and the processing the second received ultrasonic signals comprises determining the feature dimension at the first probe depth and the second probe depth.

* * * * *